(12) United States Patent
Zhu et al.

(10) Patent No.: US 12,109,880 B2
(45) Date of Patent: Oct. 8, 2024

(54) GEAR MULTIPLYING APPARATUS

(71) Applicants: Xiao Dong Zhu, Dollard-des-Ormeaux (CA); Yixin Liu, Hampstead (CA)

(72) Inventors: Xiao Dong Zhu, Dollard-des-Ormeaux (CA); Yixin Liu, Hampstead (CA)

( * ) Notice: Subject to any disclaimer, the term of this patent is extended or adjusted under 35 U.S.C. 154(b) by 0 days.

(21) Appl. No.: 17/776,285

(22) PCT Filed: Nov. 12, 2020

(86) PCT No.: PCT/CA2020/051538
§ 371 (c)(1),
(2) Date: May 12, 2022

(87) PCT Pub. No.: WO2021/092690
PCT Pub. Date: May 20, 2021

(65) Prior Publication Data
US 2022/0402357 A1  Dec. 22, 2022

Related U.S. Application Data

(60) Provisional application No. 62/934,627, filed on Nov. 13, 2019.

(51) Int. Cl.
*F16H 3/093* (2006.01)
*B60K 17/02* (2006.01)
*B60K 17/08* (2006.01)
*F16H 63/30* (2006.01)
*F16H 37/04* (2006.01)

(52) U.S. Cl.
CPC .............. *B60K 17/02* (2013.01); *B60K 17/08* (2013.01); *F16H 63/304* (2013.01); *F16H 3/093* (2013.01); *F16H 2037/045* (2013.01); *F16H 2063/3066* (2013.01)

(58) Field of Classification Search
CPC ............. F16H 2003/0936; F16H 3/093; F16H 63/304; F16H 2037/045; F16H 2063/3066; B60K 17/02; B60K 17/08; B60K 1/00
See application file for complete search history.

(56) References Cited

U.S. PATENT DOCUMENTS

| | | | | |
|---|---|---|---|---|
| 4,662,242 A | * | 5/1987 | Atkinson | ................ F16H 3/093 74/359 |
| 5,081,878 A | * | 1/1992 | Stasiuk | ................ F16H 37/043 74/357 |
| 2021/0018091 A1 | * | 1/2021 | Patrick | ................ F16H 61/0437 |

* cited by examiner

*Primary Examiner* — Tisha D Lewis
(74) *Attorney, Agent, or Firm* — Philip A. Swain; Equinox IP Inc.

(57) ABSTRACT

A gearbox apparatus includes a number of gears selectable by a user to drive a drive shaft, the number being greater than the number of gears physically connected to the drive shaft of the gearbox. The apparatus can be controlled remotely by a wireless signal emitting or receiving device, which includes a smart phone, desktop computer, a signal tower, and the like.

39 Claims, 6 Drawing Sheets

GEAR MULTIPLYING APPARATUS

CROSS-REFERENCE TO RELATED APPLICATION

The present application is a 35 U§ SC 371 national stage application from PCT application number PCT/CA2020/051538, filed on Nov. 12, 2020. Priority is hereby claimed to previously filed U.S. provisional patent application, Ser. No. 62/934,627 and filing date Nov. 13, 2019, the entire contents of which are hereby incorporated by reference.

TECHNICAL FIELD

The present invention generally concerns vehicle gearboxes, and more particularly to an apparatus for multiplying the number of gears available for translating rotation to a drive shaft.

BACKGROUND

Generally speaking, vehicles, such as cars, can require an outside controller to remotely control the vehicle. Remotely controlled cars can include an electric motor or internal combustion engine, which can operate at peak efficiency when operating at high speed. A gearbox can be located between the motor and the car wheels to allow the motor to operate efficiently across any speed. The gearbox also allows the rotational speed of the car wheels to be adjusted to a speed that is different from that of the motor's speed.

There are, however, limits to the number of gears available for use in the gearbox. Typically, size and weight restrictions limit the number of gears. Those designs where the number of gears is increased are often very difficult to maintain and are overly complicated, which requires complex and therefore expensive manufacturing costs.

Thus, there is a need for a re-designed gearbox in which the number of available gears can be selected by a user via a wireless signal emitting or receiving electronic device and, by way of orientation, multiplied to provide a multiplicity of different gear speeds and thus rotational power to a drive shaft.

BRIEF SUMMARY

Our remotely-controlled gearbox significantly reduces, or essentially eliminates the problems of contemporary gearbox designs by providing a gear multiplication apparatus. The gearbox apparatus permits a user to select a drive shaft speed based on a novel and unobvious arrangement of a number of drive gear wheels and driven gear wheels. The gearbox apparatus includes a number of parallel shafts onto which are mounted different sets of gear wheels. The user is able to remotely and wirelessly make a gear selection which translates the axial rotation of one set of gears to another set of gears so as to multiply the overall number of available gears to translate the rotational power to the drive shaft and ultimately to the vehicle wheels. The power available to the drive shaft can be managed so that rapid increases or indeed decreases are accessible to the user.

Advantageously, the number of gears the user can select to drive the drive shaft is greater than the number of gears that can be physically connected to the drive shaft, thus reducing the physical stress of the drive shaft and minimizing the size of the gearbox. Such selections can be easily made wirelessly using a program that may be downloaded onto an electronic device, such as a smart phone, desktop computer, a signal tower, and the like.

Accordingly, in one embodiment there is provided a remote-controlled apparatus for multiplying gears, the apparatus comprising:
  an input shaft;
  a responding shaft;
  a drive shaft, the shafts being selectively rotatable about respective shaft axes;
  first and second input gear wheels connected to the input shaft for axial rotation therewith;
  a first controlling gear set having two or more first controlling gear wheels mounted on the responding shaft for axial rotation therewith, one of the two or more first controlling gear wheels being selectively connected to one of the first and second input gear wheels so as to axially rotate the responding shaft; and
  a second controlling gear set having two or more second controlling gear wheels mounted on the drive shaft for axial rotation therewith, the two or more second controlling gear wheels each being connected to the two or more first controlling gear wheels so as to axially rotate the drive shaft;
  wherein the total number of available gear speeds is equal to the number of the controlling gear wheels of the first controlling gear set multiplied by the number of the controlling gear wheels of the second controlling gear set.

In one example, each of the first and second input gear wheels has an input gear wheel diameter, and each of the two or more first controlling gear wheels has a controlling gear wheel diameter, the size of the input gear wheel diameter compared to the size of the controlling gear wheel diameter determines the speed of axial rotation of the responding shaft. The input gear wheel diameter is larger, identical, or smaller compared to the controlling gear wheel diameter. The size of the first input gear wheel diameter is greater than the size of the first controlling gear wheel diameter such that the first controlling gear wheel rotates faster than the first input gear wheel. The size of the first input gear wheel diameter is equal to the size of the controlling gear wheel diameter such that the first controlling gear wheel rotates at the same speed as the first input gear wheel. The size of the first input gear wheel diameter is smaller than the size of the first controlling gear wheel diameter such that the first controlling gear wheel rotates slower than the first input gear wheel. The size of the second input gear wheel diameter is greater than the size of the second controlling gear wheel diameter such that the second controlling gear wheel rotates faster than the second input gear wheel. The size of the second input gear wheel diameter is equal to the size of the second controlling gear wheel diameter such that the second controlling gear wheel rotates at the same speed as the second input gear wheel. The size of the second input gear wheel diameter is less than the size of the second controlling gear wheel diameter such that the second controlling gear wheel rotates slower than the second input gear wheel.

In one example, the apparatus further includes: a first actuator; a first shift arm; and a first dog tooth gear, the first shift arm being actuated to selectively and separately engage first and second controlling gear wheels with the responding shaft, or selectively disengage from the first and second controlling gear wheels.

In one example, the first shift arm moves the first dog tooth gear to engage the first controlling gear wheel with the responding shaft. The first shift arm moves the first dog tooth gear to engage the second controlling gear wheel with the responding shaft.

The first shift arm moves the first dog tooth gear to selectively disengage the two first controlling gear wheels from the responding shaft. When the first or second controlling gear wheels are connected to the responding shaft, the responding shaft axially rotates at the speed at which that first or second controlling gear wheels rotate. The responding shaft freely rotates when the first and the second controlling gear wheels are disengaged therefrom. The first actuator is a first motor. The first motor is a servo motor.

In another example, the apparatus further includes a second actuator; a second shift arm; and a second dog tooth gear, the second shift arm being actuated to selectively and separately engage third and fourth controlling gear wheels, or selectively disengage from the third and fourth controlling gear wheels.

In one example, the second shift arm moves the second dog tooth gear to engage the third controlling gear wheel with the drive shaft. The second shift arm moves the second dog tooth gear to engage the fourth controlling gear wheel with the drive shaft. The second shift arm moves the second dog tooth gear to selectively disengage the two second controlling gear wheels from the drive shaft. When the third and fourth controlling gear wheels are connected to the drive shaft, the drive shaft axially rotates at the speed the third and fourth controlling gear wheels rotate. The drive shaft freely rotates when the third and the fourth controlling gear wheels are disengaged therefrom. The second actuator is a second motor. The second motor is a servo motor.

In yet another example, the apparatus further includes: a third controlling gear set having two or more third controlling gear wheels mounted on a fourth shaft for axial rotation therewith, the two or more third controlling gear wheels each being connected to the two or more first and the two or more second controlling gear wheels so as to axially rotate the drive shaft.

In one example, the apparatus further includes a third actuator; a third shift arm; a third dog tooth gear, the third shift arm being actuated to selectively and separately engage fifth and sixth controlling gear wheels, or selectively disengage from the fifth and sixth controlling gear wheels.

In one example, the third shift arm moves the third dog tooth gear to engage the third controlling gear wheel with the drive shaft. The third shift arm moves the third dog tooth gear to engage the sixth controlling gear wheel with the drive shaft.

In another example, the third shift arm moves the third dog tooth gear to selectively disengage the fifth and sixth controlling gear wheels from the drive shaft. When the fifth and sixth controlling gear wheels are connected to the drive shaft, the drive shaft axially rotates at the speed the fifth and sixth controlling gear wheel rotate. The drive shaft freely rotates when the fifth and the sixth controlling gear wheels are disengaged therefrom.

In one example, the third actuator is a third motor. The third motor is a servo motor.

In one example, two or more responding gear wheels are mounted on the responding shaft, the responding gear wheels being rotatable when the rotating shaft rotates. Four responding gear wheels are mounted on the responding shaft.

In one example, the apparatus includes two input gear wheels. The apparatus includes two input gear wheels and two controlling gear wheels. The apparatus includes two input gear wheels and four controlling gear wheels. The apparatus includes two input gear wheels and eight controlling gear wheels.

In one example, the gear wheels are toothed gear wheels. The toothed gear wheels are sized and shaped to meshingly engage each other.

In another example, a remote controller is connected to the first, second and third actuators. The remote controller is in wireless communication with the first, second and third actuators. The remote controller is a wireless signal emitting or receiving electronic device.

In one example, a first motor is connected to the input shaft.

In one example, the total number of available gears is eight. The total number of available gears is sixteen.

In another example, the apparatus described above includes a plurality of is momentum generating sources. The momentum generating sources can include electric motors, internal combustion engines, pneumatic engines, and the like.

In yet another example, the apparatus described above includes a plurality of input wheels, a plurality of controlling gear wheels, and a plurality of responding shafts, each of the responding shafts including a plurality of responding gear wheels.

Accordingly, in an alternative embodiment, there is provided a remote-controlled gear selection and multiplication network for a vehicle, the network comprising:
  a remote controller;
  an input shaft, a responding shaft and a drive shaft, each in communication with each other for rotatable movement about their respective axes;
  a set of input gear wheels;
  first, second and third sets of controlling gear wheels, the set of input gear wheels, the sets of controlling gear wheels, and the shafts being interconnected such that:
  in response to a first signal received from the remote controller one of the set of the input gear wheels connects to one of the first set of controlling gear wheels to selectively connect to the responding shaft so that one of the first set of controlling gear wheels connects to the one of the second set of controlling gear wheels thereby axially rotating the drive shaft;
  the number of controlling gear wheels in the first set of controlling gear wheels connecting to the drive shaft being multiplied by the number of gear wheels in the second set of controlling gear wheels.

Accordingly, in an alternative embodiment there is provided a set of input gears and controlling gears that allow the user to select more gears to drive the gearbox drive shaft than the number of gears that can be physically connected to the gearbox drive shaft. The input gears are driven by one or more motors. The rotation of the input gears causes the controlling gears to rotate, which in turn can cause the responding gears to rotate and which in turn can cause the drive gears to rotate. The rotation of the drive gears can cause the drive shaft of the gearbox to rotate.

Accordingly, in another alternative embodiment there is provided a method of changing the speed of a gearbox drive shaft, the method comprising engaging one controlling gear of at least two controlling gears and engaging at least one drive gear or at least one responding gear.

BRIEF DESCRIPTION OF FIGURES

Further features and advantages of the present invention will become apparent from the following detailed description, taken in combination with the appended drawings, in which.

DETAILED DESCRIPTION

Definitions

Figure 1:
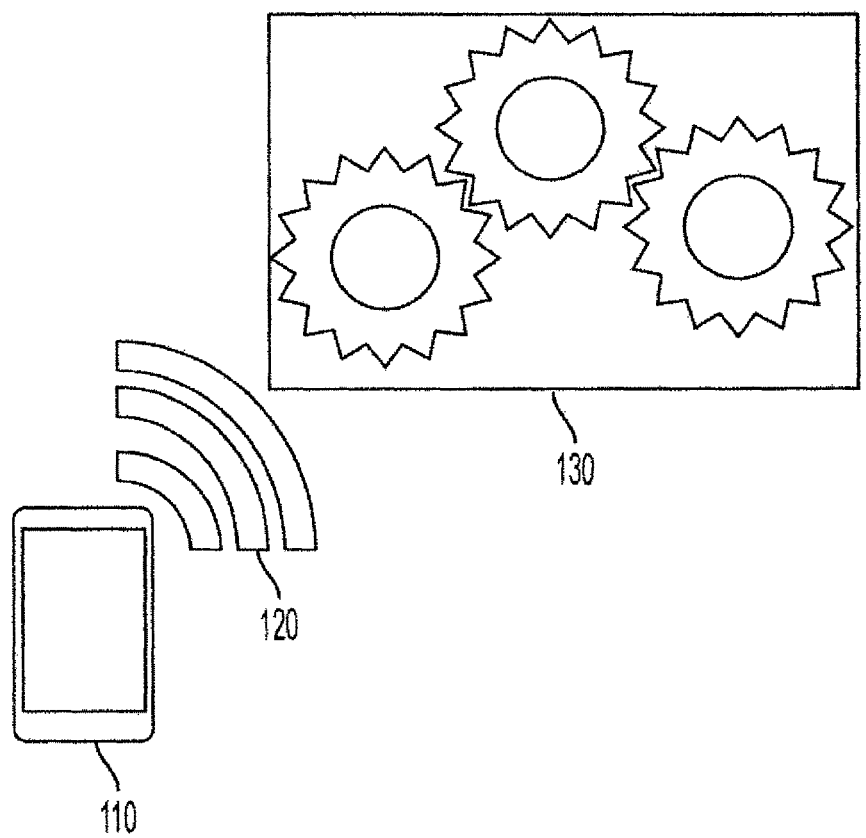
FIG. 1 is a schematic representation of an embodiment of a gearbox remotely-controlled by a wireless device.

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

Generally speaking, the apparatus described below includes input gears, controlling gears, and responding gears. A first set of gears, the so-called input gears, are connected to one or more drive shafts that can be driven by one or more motors. These input gears can rotate as a result of the rotation of the one or more drive shafts driven by the one or more motors. The input gears can also cause the remainder of the gears to rotate. The controlling gears can rotate as a result of the input gears rotating. The controlling gears can be gears that effectively multiply the number of gears that can cause the drive shaft to rotate. Therefore, advantageously, the controlling gears can act as a complementary multiplier gearbox to the driveshaft, making it capable of axially rotating at gear speeds beyond the numbers of gears that is physically attached to it, thus reducing the physical stress of the drive shaft and minimizing the size of the gearbox. The responding gears can rotate, and therefore respond, to the rotation of the controlling gears. Furthermore, although there are four gear wheels attached to the drive shaft, the drive shaft can axially rotate at eight different speeds. This is because it is connected to a "two gears responding shaft" and therefore this creates a 2x4 gearbox layout. Moreover, the change in the speed of the axial rotation of the drive shaft happens while keeping the motor at a constant speed.

A person of ordinary skill in the art will readily recognize that the various gear wheels (or simply "gears") referred to throughout this description each includes a plurality of circumferentially disposed spaced apart teeth, the number of which are determined by the gear wheel diameter and therefore the circumference. As is well known, the gear wheels translate their rotational energy when the teeth meshingly engage each other to transfer rotational energy from a drive gear wheel to a driven gear wheel. The size of the gear wheels determines the speed of axial rotation of an adjacent gear wheel when meshingly engaged therewith. The shafts all described herein have an axial longitudinal axis about which they rotate at speeds determined by the gear wheels engaged.

As will become apparent with our description below, our design centers on the multiplication of axially rotatable gear speeds. The total number of available gear speeds is equal to the number of the controlling gear wheels of a first controlling gear set multiplied by the number of the controlling gear wheels of a second controlling gear set.

Referring to now FIG. 1, a remote-controlled apparatus for multiplying the number of gears, which are available to communicate with a drive shaft, is shown generally at 100. In one example, the drive shaft can be connected via joints to the axles, as will be explained below. Broadly speaking, the apparatus 100 is controlled remotely via a wireless device 110, which is wirelessly connected by a wireless link 120 to the apparatus 100 so as to control a gearbox assembly 130, which will be described in more detail below. A user is able to use the wireless device 110 to select and control which gear out a plurality of gears in the gearbox 130 is selected or de-selected. By way of a non-limiting example, the wireless device 110 can include a plurality of electronic devices such as a smart phone, a desktop computer, a signal tower, and the like. The wireless link 120 can include radio technology family of protocol standards IEEE 802.11x, and more specifically the wireless link 120 can be used over a broader area via a wireless signal. Moreover, the gear selection may be accomplished by way of a software program, which the user may download to a smart phone, desktop and laptop computer and the like. Broadly speaking, the inclusion of a wireless device 110 and wireless link 120 provides a network into which the apparatus can be integrated and operate either in close proximity or remotely, depending on the strength of the wireless signals transmitted and received either to the apparatus or from the apparatus. The wireless signal emitting or receiving electronic device include, for example, a smart phone, desktop computer, a signal tower, and the like Referring to FIG. 2, broadly speaking, the apparatus includes an input shaft 220, a responding shaft 325 and a drive shaft 250. An electric motor 210 is connected to an input shaft 220. The input shaft 220 can axially rotate when the electric motor 210 is powered. The shafts 220, 325, 250 are disposed generally parallel to each other are axially rotatable about their respective axis of rotation. As will be explained below in more detail, the shafts 220, 325, 250 are each selectively rotatable about respective shaft axes when they are selected to do so by way of a signal send from a remote controller 110, as shown in FIG. 1. The gear wheels described herein are toothed gear wheels, which are sized and shaped to meshingly engage each other, when selected. The remote controller 110 is a wireless signal emitting or receiving electronic device.

Broadly speaking, the apparatus 100 includes first and second input gear wheels 230, 240 that are connected to the input shaft 220. An electric motor 210 is connected to the input shaft 220. The apparatus broadly includes a first controlling gear set and a second controlling gear set.

The first controlling gear wheel set includes two controlling gear wheels 310, 315 that are mounted on the responding shaft 325 for axial rotation. In the example illustrated, the two controlling gear 310, 315 are mounted on the responding shaft. A person skilled in the art will recognize that any number of input gear wheels and first and second controlling gears may be mounted on their respective shafts in any configuration. However, the restrictions on the number of gear wheels will be determined by the size of the gearbox casing and indeed the power needed to drive the vehicle. The second controlling gear set includes two or more second controlling gear wheels that are mounted on the drive shaft 250 for axial rotation therewith. The two or more second controlling gear wheels are each connected to the two or more first controlling gear wheels so as to axially rotate the drive shaft 250. In the example shown, the second controlling gear wheels include controlling gear wheels 410, 415, 420, 425.

Advantageously, the gearbox design provides the user with the ability to multiply the number of gears available to drive the wheels of the vehicle. This is achieved by selecting the total number of the gear wheels that are available to axially rotate the drive shaft is equal to the number of the first controlling gear wheels multiplied by the number of the first and second input gear wheels and the second controlling gear wheels.

Figure 2:
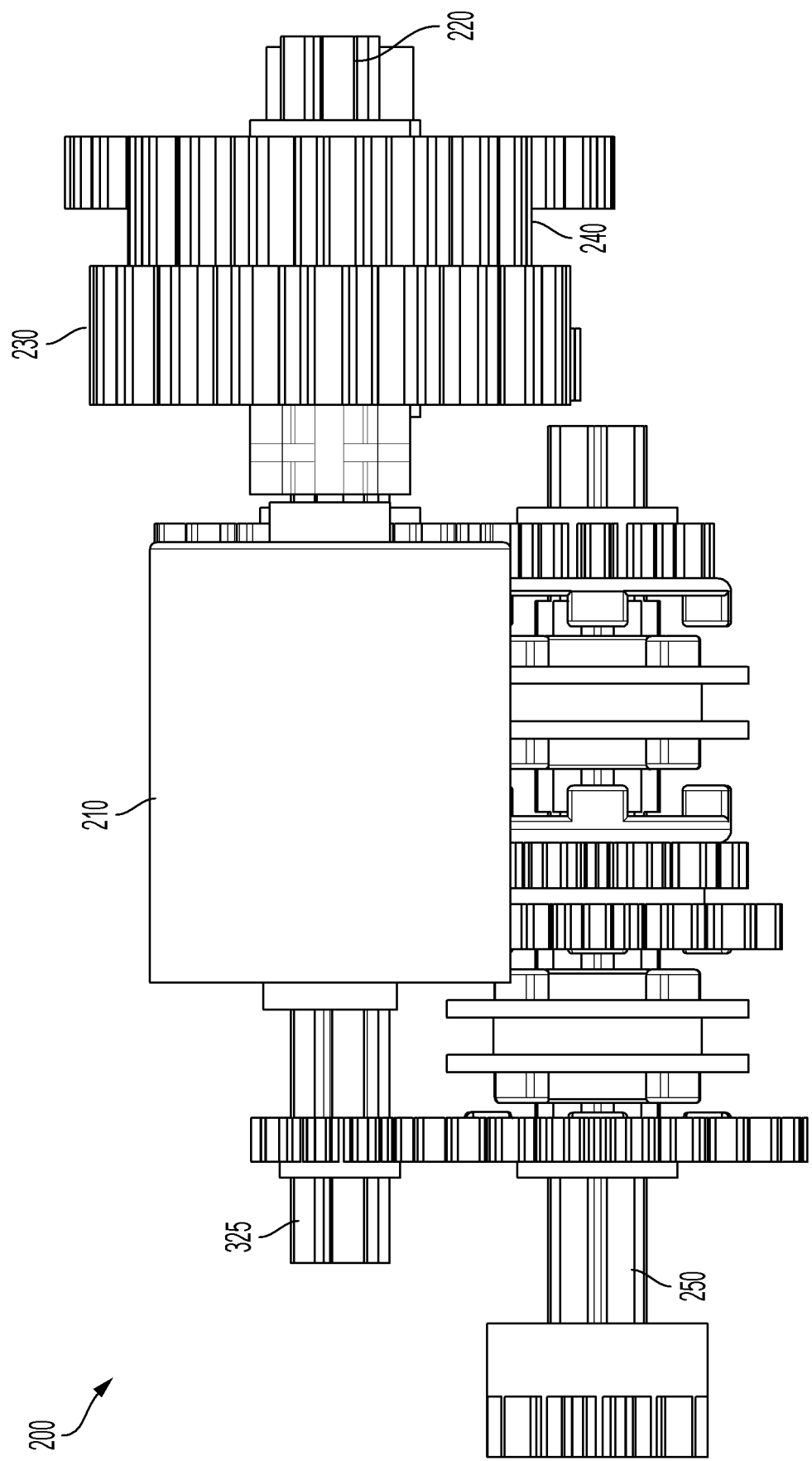
FIG. 2 is a side view of an embodiment of a gearbox.
Figure 3:
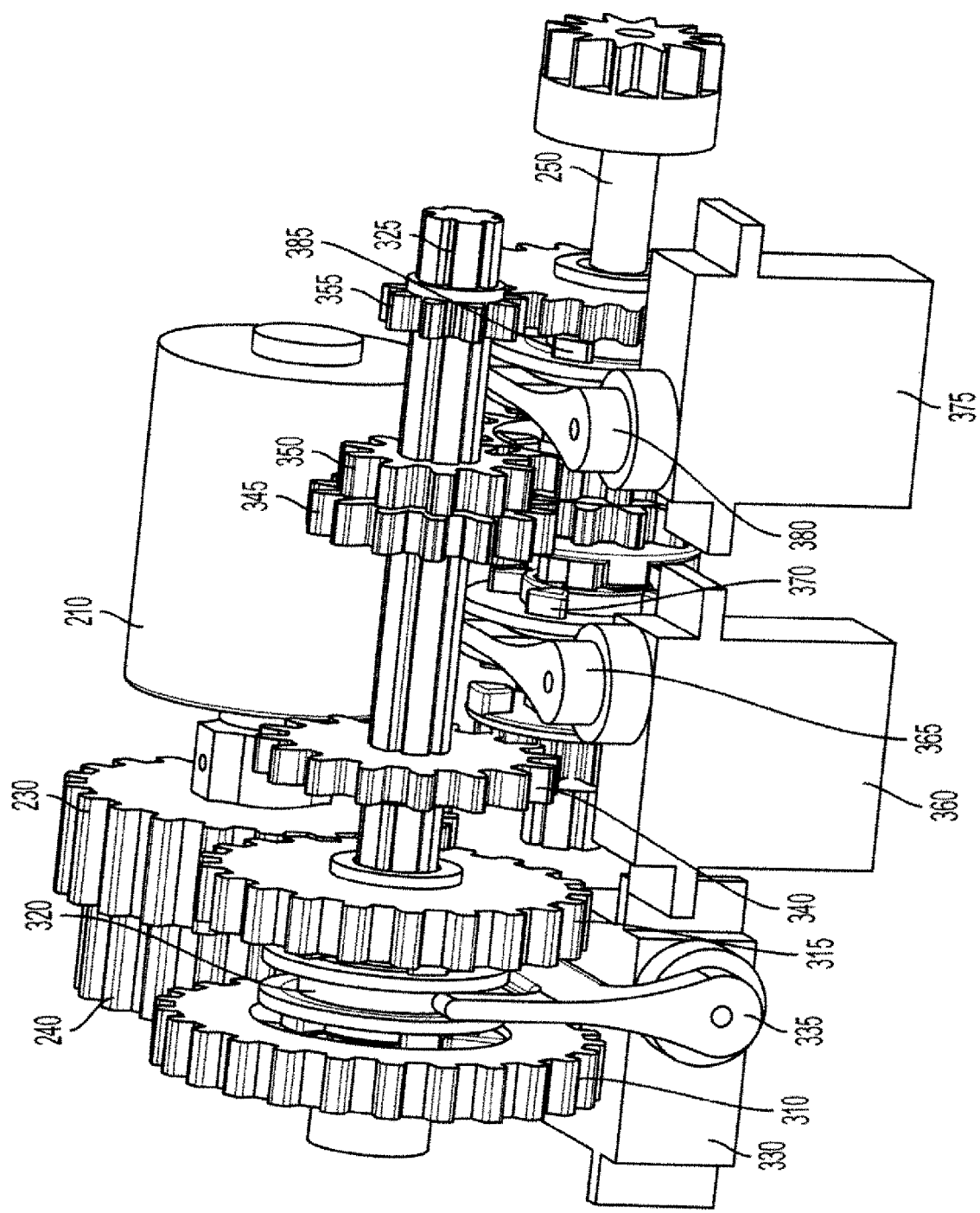
FIG. 3 is an angled perspective side view of an embodiment of a gearbox.

Referring to FIGS. 2 and 3, the size of the input gear wheels 230, 240 and controlling gear wheels 310, 315 affects the speed the gear wheels rotate. It is well known that the size of the gear wheel is determined by the size of its diameter which in turn is related to the circumference. Each of the first and second input gear wheels 230, 240 has an input gear wheel diameter, and each of the two or more first controlling gear wheels 310, 315 has a controlling gear wheel diameter. The size of the input gear wheel diameter 240 when compared to the size of the controlling gear wheel 310 diameter determines the speed by which the responding shaft 325 axially rotates when the controlling gear wheel 310 is connected to the responding shaft 325. The size of the input gear wheel diameter 230 when compared to the size of the controlling gear wheel 315 diameter determines the speed by which the responding shaft 325 axially rotates when the controlling gear wheel 315 is connected to the responding shaft 325. In a number of examples, we have produced input gear wheels in which the input gear wheel 240 diameter is larger, identical or smaller in size when compared to the controlling gear wheel 310 diameter. We determined that when the size of the first input gear wheel 240 diameter is greater than the size of the first controlling gear wheel 310 diameter, the first controlling gear wheel 310 rotates at a faster speed compared to that of the first input gear wheel 240. Also, when the size of the first input gear wheel 240 diameter is equal to the size of the controlling gear wheel 310 diameter, the first controlling gear wheel 310 rotates at the same speed as the first input gear wheel 240. Also, when the size of the first input gear wheel 240 diameter is less than the size of the first controlling gear wheel 310 diameter, the first controlling gear wheel 310 rotates slower than the first input gear wheel 240. In a number of examples, we have produced input gear wheels in which the input gear wheel 230 diameter is larger, identical or smaller in size when compared to the controlling gear wheel 315 diameter. We determined that when the size of the second input gear wheel 230 diameter is greater than the size of the second controlling gear wheel 315 diameter, the second controlling gear wheel 315 rotates at a faster speed compared to that of the second input gear wheel 230. Also, when the size of the second input gear wheel 230 diameter is equal to the size of the second controlling gear wheel 315 diameter, the second controlling gear wheel 315 rotates at the same speed as the second input gear wheel 230. Finally, when the size of the second input gear wheel 230 diameter is less than the size of the second controlling gear wheel 315 diameter, the second controlling gear wheel 315 rotates at a slower speed than the second input gear wheel 230.

Still referring to FIG. 3, the operation of the controlling gear set 1 will now be described. A first actuator 330, a first shift arm 335; and a first dog tooth gear 320 are operatively connected to each other so that the first shift arm 335 is actuated to selectively and separately so as to engage the first and the second controlling gear wheels 310, 315 with the responding shaft 325. Alternatively, the responding shaft 325 can be selectively disengaged from the first and second controlling gear wheels 310, 315. In one example, the first actuator 330 is a servo motor, which is an electrically driven and which provides rotatable movement to the first shift arm 335 so that it can move between three positions along a restricted path of travel, as desired. Upon receipt of a signal from the remote controller 110, as shown in FIG. 1, the first shift arm 335 moves the first dog tooth gear 320 so as to engage the first controlling gear wheel 310 with the responding shaft 325. The first shift arm 335 moves the first dog tooth gear 320 so that it engages the second controlling gear wheel 315 with the responding shaft 325. In a neutral configuration, or position, the first shift arm can be selected to move the first dog tooth gear 320 so that it disengages the two first controlling gear wheels 310, 315 from the responding shaft 325. When the first or the second controlling gear wheels 310, 315 are connected to the responding shaft 325, the responding shaft 325 axially rotates at the speed at which the first or second controlling gear wheels 310, 315 rotate. In the neutral configuration, the responding shaft 325 freely rotates when the first and the second controlling gear wheels 310, 315 are disengaged from the responding shaft 325. Thus, in the first position, the dog tooth gear 320 physically connects the controlling gear 310 with the responding shaft 325, but does not physically connect the controlling gear 315 with the responding shaft 325. In the second position, the dog tooth gear 320 can physically connect the controlling gear 315 with the responding shaft 325, but does not physically connect the controlling gear 310 with the responding shaft 325. In the third position, the dog tooth gear 320 cannot physically connect the controlling gear 310 with the responding shaft 325 and also does physically connect the controlling gear 315 with the responding shaft 325. The responding shaft 325 can be caused to axially rotate when either of the controlling gear 310 or the controlling gear 315 are physically connected with the responding shaft 325. As a result, the responding shaft 325 can axially rotate at the same speed as the controlling gear 310 when the controlling gear 310 is physically connected with the controlling shaft 325 or at the same speed as the controlling gear 315 when the controlling gear 315 is physically connected with the controlling shaft 325. In a neutral configuration, the controlling gear 310 can spin freely and not cause the responding shaft 325 to rotate when the controlling gear 310 is not physically connected with the responding shaft 325. The controlling gear 315 can also spin freely and not cause the responding shaft 325 to axially rotate when the controlling gear 315 is not physically connected with the responding shaft 325. Therefore, the responding shaft 325 does not axially rotate when both the controlling gear 310 and the controlling gear 315 are not physically connected with the responding shaft 325.

Figure 4:
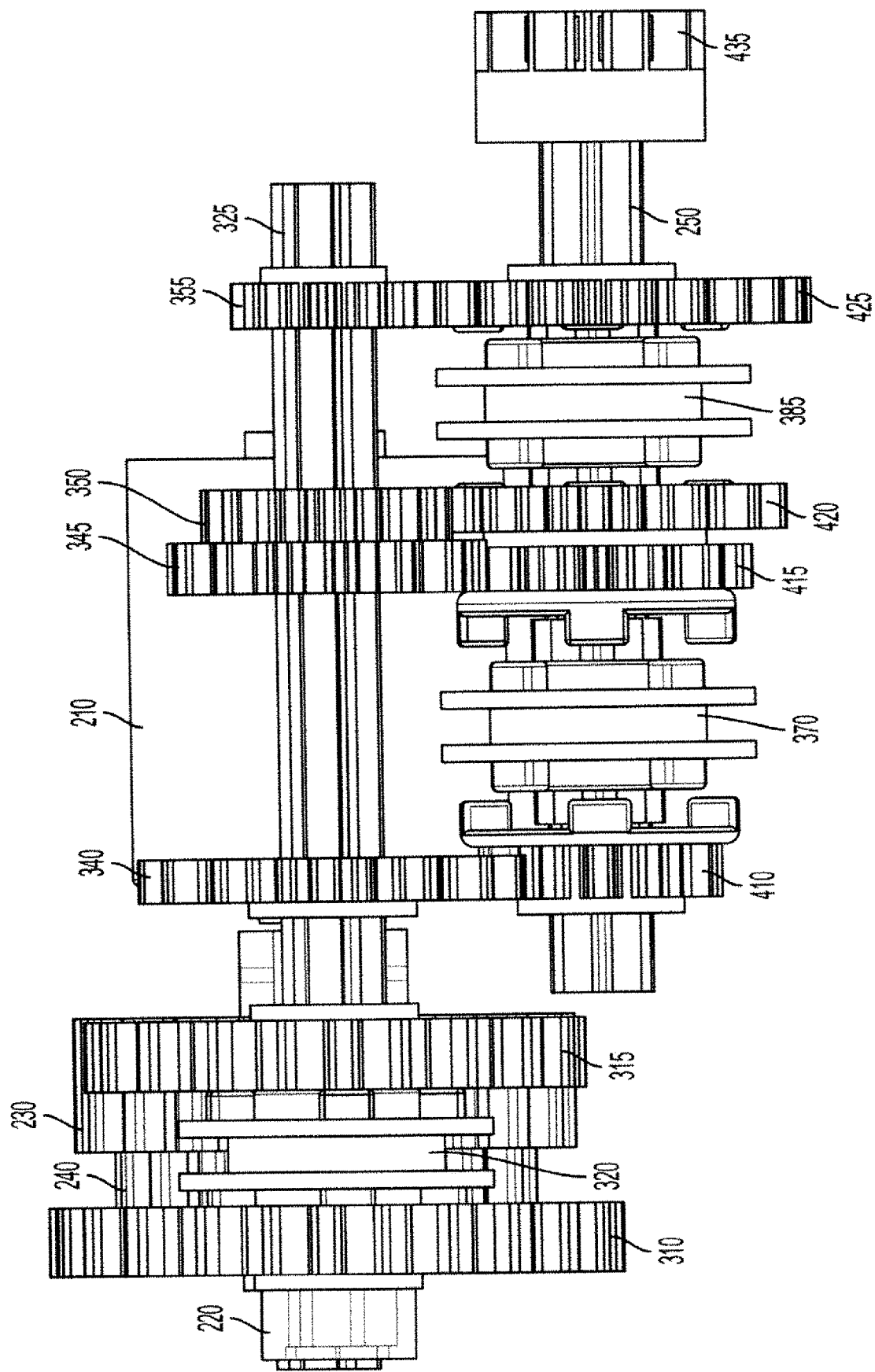
FIG. 4 is a side view of an embodiment of a gearbox.

Referring to FIGS. 3 and 4, the operation of the controlling gear set 2 will now be described in detail. A second actuator 360 is connected to a second shift arm 365 which is operatively connected to a second dog tooth gear 370. The second shift arm 365, like the first shift arm, is actuated so as to selectively and separately engage a third and a fourth controlling gear wheels 410, 415. Alternatively, in a neutral configuration, the second shift arm 365 can be selected to disengage the drive shaft 250 from the third and fourth controlling gear wheels 410, 415. The second actuator 360 is a second servo motor. As is best illustrated in FIG. 3, the second shift arm 365 is disposed generally orthogonal to the first shift arm 335. A third actuator 375 is connected to a third shift arm 380 which is operatively connected to a third dog tooth gear 385. The third shift arm 380, like the first and second shift arms 335, 365, is actuated so as to selectively and separately engage a fifth and a sixth controlling gear wheel 420, 425. Alternatively, in a neutral configuration, the third shift arm 380 can be selected to disengage the drive shaft 250 from the fifth and sixth controlling gear wheels 420,425. The third actuator 375 is a second servo motor. As is best illustrated in FIG. 3, the third shift arm 380 is disposed generally orthogonal to the first shift arm 335.

Referring now to FIG. 4, the second dog tooth gear 370 can be moved into in one of three positions. In the first position, the second dog tooth gear 370 selects the controlling gear 410 to be physically connected with the drive shaft 250 and does not select the controlling gear 415 to be physically connected with the drive shaft 250. In the second position, the second dog tooth gear 370 selects the controlling gear 415 to be physically connected with the drive shaft 250 and does not select the controlling gear 410 to be physically connected with the drive shaft 250. In the third position, the dog tooth gear 370 does not select the controlling gear 410 to be physically connected with the drive shaft 250 and also does not select the controlling gear 415 to be physically connected with the drive shaft 250. The third dog tooth gear 385 can also be moved into one of three positions. In the first position, the third dog tooth gear 385 selects the controlling gear 420 to be physically connected with the drive shaft 250 and does not select the controlling gear 425 to be physically connected with the drive shaft 250. In the second position, the third dog tooth gear 385 selects the controlling gear 425 to be physically connected with the drive shaft 250 and does not select the controlling gear 420 to be physically connected with the drive shaft 250. Finally, in the third position, the third dog tooth gear 385 does not select the controlling gear 420 to be physically connected with the drive shaft 250 and also does not select the controlling gear 425 to be physically connected with the drive shaft 250.

Still referring to FIG. 4, the controlling gears included in controlling gear set 2, specifically, the controlling gear 410 can be in physical contact with a responding gear 340, the controlling gear 415 can be in contact with a responding gear 345, the controlling gear 420 can be in contact with a responding gear 350, and the controlling gear 425 can be in contact with a responding gear 355. The responding gears 340, 345, 350, 355 are permanently physically connected to the responding shaft 325 and are spaced apart from each other. As a result of these physical connections, the controlling gear 410 can axially rotate when the responding gear 340 axially rotates, the controlling gear 415 can axially rotate when the responding gear 345 axially rotates, the controlling gear 420 can axially rotate when the responding gear 350 axially rotates, and the controlling gear 425 can axially rotate when the responding gear 355 axially rotates. However, the drive shaft 250 can axially rotate only when one of the controlling gear 410, the controlling gear 415, the controlling gear 420, or the controlling gear 425 are physically connected with the drive shaft 250. Moreover, only one of the controlling gear wheels 410, the controlling gear 415, the controlling gear wheel 420, or the controlling gear wheel 425 is selectively connected to the drive shaft 250 via its associated dog tooth gear at a time. Similarly, the drive shaft 250 can axially rotate at the same speed as the controlling gear wheel 410 when the controlling gear wheel 410 is physically connected with the drive shaft 250 or at the same speed as the controlling gear wheel 415 when the controlling gear wheel 415 is physically connected with the drive shaft 250, or at the same speed as the controlling gear wheel 420 when the controlling gear wheel 420 is physically connected with the drive shaft 250 or at the same speed as the controlling gear wheel 425 when the controlling gear wheel 425 is physically connected with the drive shaft 250. Therefore, the drive shaft 250 axially rotates freely (but not driven) when not physically connected with one of the controlling gear wheels 410, the controlling gear wheel 415, the controlling gear wheel 420, or the controlling gear wheel 425. Also, the controlling gear wheel 410, the controlling gear wheel 415, the controlling gear wheel 420, and the controlling gear wheel 425 can spin freely and do not cause the drive shaft 250 to axially rotate when the controlling gear wheel 410 or the controlling gear wheel 415 or the controlling gear wheel 420 or the controlling gear wheel 425 are not physically connected with the drive shaft 250.

Still referring to FIG. 4, a coupling 435 is attached to the drive shaft 250, which axially rotates when the drive shaft 250 axially rotates. The coupling 435 can be connected to an additional shaft or a differential (not shown) that drives one of more wheels of a remotely controlled car. Thus, when the drive shaft 250 axially rotates, the coupling 435 also axially rotates and causes the additional shaft (not shown) to axially rotate. As a result, one or more of the wheels of the remotely controlled vehicle are caused to axially rotate when the drive shaft 250 axially rotates, the coupling 435 axially rotates, and the additional shaft or differential (not shown) also axially rotates.

Referring now to FIGS. 3 and 4, the responding gear wheels 340, 345, 350, and 355 can all be permanently physically connected to the responding shaft 325 and, as a result, the responding gear wheels 340, 345, 350, and 355 can axially rotate when the responding shaft 325 axially rotates. Alternatively (not shown), the responding gear wheels 340, 345, 350, and 355 can be physically connected with the responding shaft 325 when the dog tooth gear associated with the responding gear wheel 340, the dog tooth gear associated with the responding gear wheel 345, the dog tooth gear associated with the responding gear wheel 350, or the dog tooth gear associated with the responding gear wheel 355 moved into a position that can physically connect the associated responding gear wheel with the responding shaft 325.

In one embodiment described, the apparatus 100 can include two input gear wheels 230, 240 and also include two controlling gear wheels 310, 315. As noted above, these two controlling gear wheels 310, 315 are part of the controlling gear set 1. Alternatively, another embodiment can include more than two input gear wheels in the controlling gear set 1. Those skilled in the art will appreciate that the number of controlling gear wheels included in the controlling gear set 1 can equal the number of input gear wheels. Thus, the number of the controlling gear wheels that can be included in controlling gear set 1 effectively, and advantageously, multiplies the number of gears that can cause the drive shaft 250 to axially rotate.

In one example, the gearbox can include the controlling gear set 2 that can include four controlling gear wheels. The controlling gear wheels that can be included in the controlling gear set 2 are the gear wheels that can be physically connected to the drive shaft 250. The gearbox in this example can also include the controlling gear set 1, which can include two controlling gear wheels that are physically in contact with two input gear wheels. In this example, the gearbox has eight gear speed outputs in total. This gearbox has eight gear speed outputs because the four controlling gear wheels included in the controlling gear set 2 are multiplied by the two controlling gear wheels included in the controlling gear set 1. Thus, the user of the gearbox in this example can select one of eight gears that can cause the drive shaft 250 to axially rotate.

In a second example (not shown), the gearbox can include the controlling gear set 2 that can include four controlling gear wheels. As described above, the controlling gear wheels that can be included in the controlling gear set 2 are the gear wheels that can be physically connected to the drive shaft 250. The gearbox in this example can include the controlling gear set 1 which can include three controlling gear wheels that can be physically connected to three input gear wheels. In this example, the gearbox has twelve gears in total. This gearbox has twelve gears because the four controlling gear wheels included in the controlling gear set 2 are multiplied by three controlling gear wheels included in the controlling gear set 1. Thus, the user of the gearbox in this example can select one of twelve gear wheels that can cause the drive shaft 250 to axially rotate.

Figure 5:
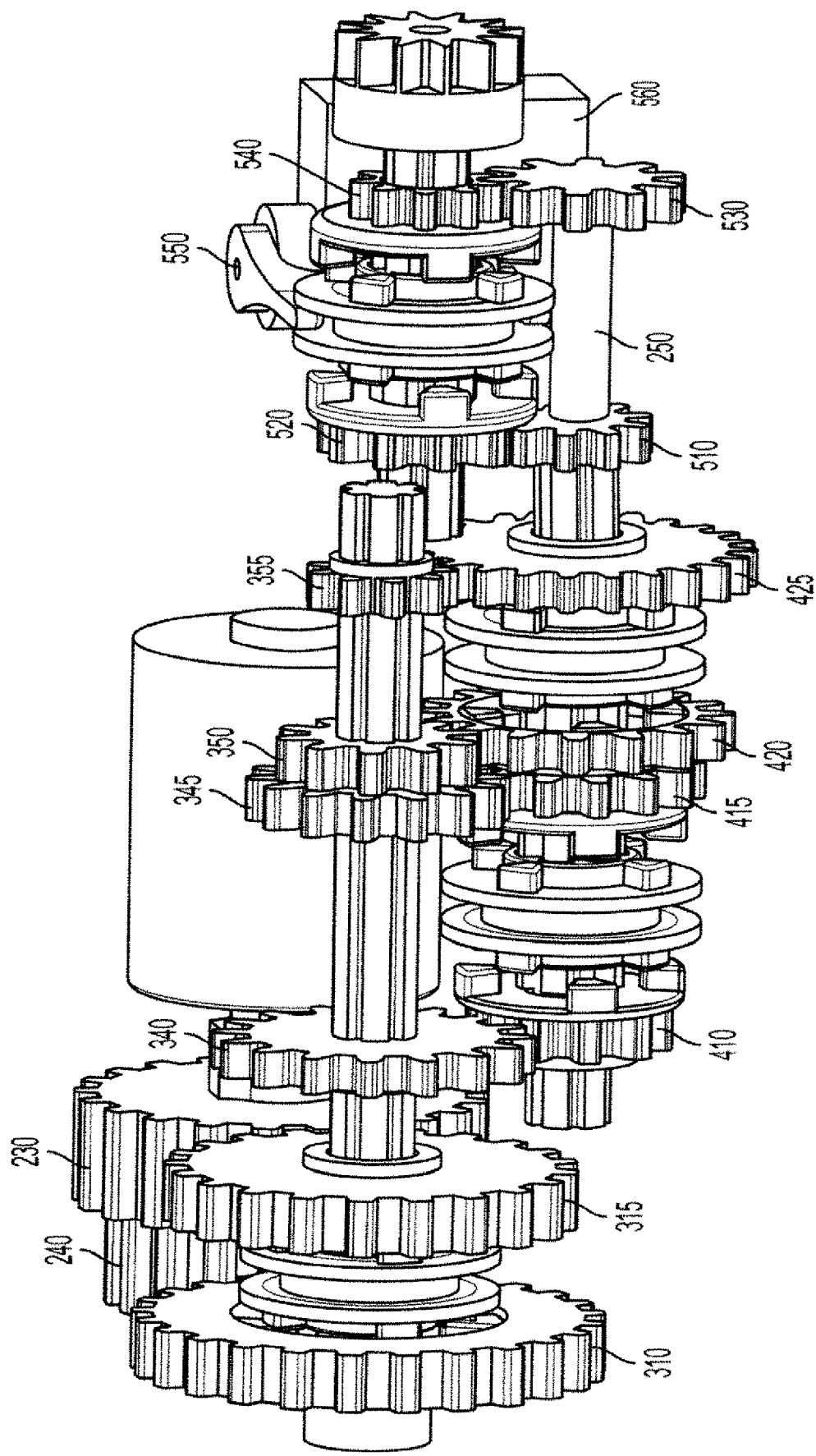
FIG. 5 is a perspective side view of a sixteen (16) gear gearbox.
Figure 6:
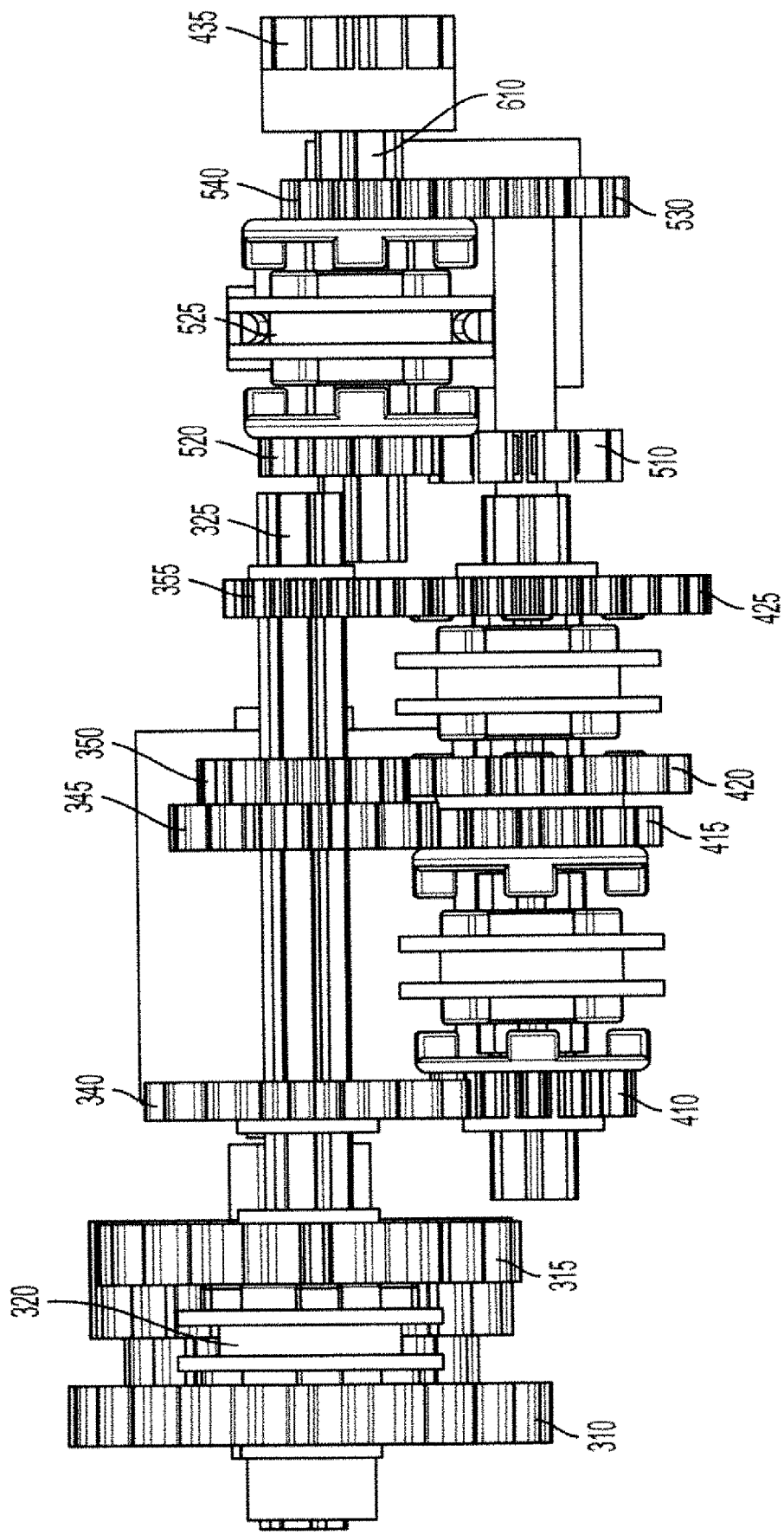
FIG. 6 is a side view of a sixteen (16) gear gearbox.

In a final example, as specifically illustrated in FIGS. 5 and 6, the gearbox can include the controlling gear set 2 which can include four controlling gear wheels 410, 415, 420, 425. Again, the controlling gear wheels that can be included in the controlling gear set 2 are the gear wheels that can be physically connected to the drive shaft 250 (the controlling gear wheels 410, 415, 420, and 425). The gearbox in this example can include the controlling gear set 1 that can include the two controlling gear wheels 310, 315, and the gearbox can also include the two input gear wheels 230, 240.

Still referring to FIGS. 5 and 6, the operation of a controlling gear set 3 will now be described in detail. The controlling gear set 3 can includes two controlling gear wheels 520, 540 and the gear wheels included in controlling gear set 3 can be physically connected to a fourth shaft 610, which also lies substantially parallel with the other shafts described above. As described above, the responding shaft 325 can be caused to axially rotate as a result of the rotation of the controlling gear wheel 310, 315 of the controlling gear set 1 when they are physically connected to the responding shaft 325, or to not axially rotate when the controlling gears 310, 315 are not physically connected to the responding shaft 325. Also, as described above, the responding gears 340, 345, 350, 355 can cause the drive shaft 250 to axially rotate when one of the controlling gears 410, 415, 420, 425 of the controlling gear set 2 are physically connected to the drive shaft 250.

Two responding gears 510, 530 can be physically connected to the drive shaft 250 such that the responding gears 510, 530 axially rotate when the shaft 250 axially rotates. A fourth actuator 560 is connected to a fourth shift arm 550 which is operatively connected, in a first position to move a fourth dog tooth gear 525 and cause the controlling gear 520 to be physically connected to the fourth shaft 610 and the controlling gear 540 to not be connected to the fourth shaft 610. The actuator, a servo motor, 560 can be actuated to cause the shift arm 550 to axially rotate to a second position to move the dog tooth gear 525 and cause the controlling gear 540 to be physically connected to the fourth shaft 610 and the controlling gear 520 to not be connected to the fourth shaft 610. The actuator 560 can be actuated to cause the shift arm 550 to axially rotate to a third position to move the dog tooth gear 525 and cause the controlling gear 520 to not be physically connected to the fourth shaft 610 and also the controlling gear 540 to not be physically connected to the fourth shaft 610.

The controlling gear 520 can be physically connected to the responding gear 510 such that when the responding gear 510 axially rotates, the controlling gear 520 can be caused to axially rotate. Also, the controlling gear 540 can be physically connected to the responding gear 530 such that when the responding gear 530 axially rotates, the controlling gear 540 can be caused to axially rotate. Thus, when the controlling gear 520 is physically connected to the fourth shaft 610, the fourth shaft 610 can be caused to axially rotate as a result of the rotation of the controlling gear 520. Furthermore, when the controlling gear 540 is physically connected to the fourth shaft 610, the fourth shaft 610 can be caused to axially rotate as a result of the rotation of the controlling gear 540. The fourth shaft 610 axially rotates freely (but not driven) when the controlling gear 520 and the controlling gear 540 are both not physically connected to the fourth shaft 610.

In this example, as shown in FIGS. 5 and 6, the gearbox has sixteen gear speed outputs in total. There are sixteen gear speed outputs because the four controlling gear wheels included in the controlling gear set 2 are multiplied by the two controlling gear wheels included in the controlling gear set 3 multiplied by the two controlling gear wheels included in controlling gear set 1. Thus, the user of the gearbox in this example can select one of sixteen gears that can cause drive shaft 250 to axially rotate.

In summary, the examples described herein include a single electric motor 210, a plurality of input gear wheels, a plurality of controlling gear wheels, and one responding shaft 325 with a plurality of responding gear wheels.

In other examples which, for the sake of brevity, are not shown, include a plurality of, but not limited to, momentum generating sources such as electric motors, internal combustion engines, pneumatic engines, and the like a plurality of input gear wheels, a plurality of controlling gear wheels, and a plurality of responding shafts whereby each responding shaft includes a plurality of responding gear wheels.

Other Embodiments

From the foregoing description, it will be apparent to one of ordinary skill in the art that variations and modifications may be made to the embodiments described herein to adapt it to various usages and conditions.

What is claimed is:

1. A remote-controlled apparatus for multiplying gears, the apparatus comprising:
an input shaft;
a responding shaft;
a drive shaft, the shafts being selectively rotatable about respective shaft axes;
first and second input gear wheels connected to the input shaft for axial rotation therewith;
a first controlling gear set having two or more first controlling gear wheels mounted on the responding shaft for axial rotation therewith, one of the two or more first controlling gear wheels being selectively connected to one of the first and second input gear wheels so as to axially rotate the responding shaft; and
a second controlling gear set having two or more second controlling gear wheels mounted on the drive shaft for axial rotation therewith, the two or more second controlling gear wheels each being connected to the two or more first controlling gear wheels so as to axially rotate the drive shaft;
wherein the total number of available gear speeds is equal to the number of the controlling gear wheels of the first controlling gear set multiplied by the number of the controlling gear wheels of the second controlling gear set.

2. The apparatus, according to claim 1, in which each of the first and second input gear wheels has an input gear wheel diameter, and each of the two or more first controlling gear wheels has a controlling gear wheel diameter, the size of the input gear wheel diameter compared to the size of the first controlling gear wheel diameter determines the speed of axial rotation of the responding shaft.

3. The apparatus, according to claim 2, in which the input gear wheel diameter is larger, identical, or smaller compared to the first controlling gear wheel diameter.

4. The apparatus, according to claim 2, in which (i) the size of the first input gear wheel diameter is greater than the size of the first controlling gear wheel diameter of a corresponding first one of the first controlling gear wheels such that the first one of the first controlling gear wheels rotates faster than the first input gear wheel; (ii) the size of the first input gear wheel diameter is equal to the size of the first controlling gear wheel diameter of the first one of the first controlling gear wheels such that the first one of the first controlling gear wheels rotates at the same speed as the first input gear wheel; and (iii) the size of the first input gear wheel diameter is smaller than the size of the first controlling gear wheel diameter of the first one of the first controlling gear wheels such that the first one of the first controlling gear wheels rotates slower than the first input gear wheel.

5. The apparatus, according to claim 2, in which (i) the size of the second input gear wheel diameter is greater than the size of the first controlling gear wheel diameter of a corresponding second one of the first controlling gear wheels such that the second one of the first controlling gear wheels rotates faster than the second input gear wheel; (ii) the size of the second input gear wheel diameter is equal to the size of the first controlling gear set wheel diameter of the second one of the first controlling gear wheels such that the second one of the first controlling gear wheels rotates at the same speed as the second input gear wheel; and (iii) the size of the second input gear wheel diameter is less than the size of the first controlling gear set wheel diameter of the second one of the first controlling gear wheels such that the second one of the first controlling gear wheels rotates slower than the second input gear wheel.

6. The apparatus, according to claim 1, further includes:
a first actuator;
a first shift arm; and
a first dog tooth gear,
the first shift arm being actuated to (i) selectively and separately engage or (ii) selectively disengage the first controlling gear wheels of the first controlling gear set with the responding shaft.

7. The apparatus, according to claim 6, in which (i) the first shift arm moves the first dog tooth gear to engage a first one of the first controlling gear wheels with the responding shaft; (ii) the first shift arm moves the first dog tooth gear to engage a second one of the first controlling gear wheels of the first controlling wheel gear set with the responding shaft; and (iii) the first shift arm moves the first dog tooth gear to selectively disengage both of the first controlling gear wheels from the responding shaft, the responding shaft freely rotating when both of the first controlling gear wheels are disengaged from the responding shaft.

8. The apparatus, according to claim 6, in which, when one of the first controlling gear wheels of the first controlling wheel gear set are connected to the responding shaft, the responding shaft axially rotates at the speed at which that first controlling gear wheel rotates; the responding shaft freely rotates when the first controlling gear wheels of the first controlling gear set are disengaged therefrom.

9. The apparatus, according to claim 6, in which the first actuator is a first motor.

10. The apparatus, according to claim 9, in which the first motor is a servo motor.

11. The apparatus, according to claim 6, further including:
a second actuator;
a second shift arm; and
a second dog tooth gear;
the second shift arm being actuated to (i) selectively and separately engage or (ii) selectively disengage a first one and a second one of the second controlling gear wheels of the second controlling gear set with the drive shaft.

12. The apparatus, according to claim 11, in which (i) the second shift arm moves the second dog tooth gear to engage the first one of the second controlling gear wheels with the drive shaft; and (ii) the second shift arm moves the second dog tooth gear to engage the second one of the second controlling gear wheels with the drive shaft; and (iii) the second shift arm moves the second dog tooth gear to selectively disengage both the first one and the second one of the second controlling gear wheels from the drive shaft, the drive shaft freely rotating when the first one and the second one of the second controlling gear wheels are disengaged from the drive shaft.

13. The apparatus, according to claim 11, in which, when one of the second controlling gear wheels is connected to the drive shaft, the drive shaft axially rotates at the speed at which that said one of the second controlling gear wheels rotates.

14. The apparatus, according to claim 11, in which the drive shaft freely rotates when the second controlling gear wheels are disengaged therefrom.

15. The apparatus, according to claim 11, in which the second actuator is a second motor.

16. The apparatus, according to claim 15, in which the second motor is a servo motor.

17. The apparatus, according to claim 11, further includes:
a third controlling gear set having two or more third controlling gear wheels mounted on a fourth shaft for axial rotation therewith, the third controlling gear wheels are connected to the second controlling gear wheels to axially rotate the fourth shaft.

18. The apparatus, according to claim 17, further including:
a third actuator;
a third shift arm;
a third dog tooth gear;
the third shift arm being actuated to (i) selectively and separately engage or (ii) selectively disengage a third one and a fourth one of the second controlling gear wheels of the second controlling gear set with the drive shaft.

19. The apparatus, according to claim 18, in which (i) the third shift arm moves the third dog tooth gear to engage the third one of the second controlling gear wheels of the second controlling gear set with the drive shaft; (ii) the third shift arm moves the third dog tooth gear to engage the fourth one of the second controlling gear wheels of the second controlling gear set with the drive shaft; and (iii) the third shift arm moves the third dog tooth gear to selectively disengage both the third and fourth second controlling gear wheels of the second controlling gear set from the drive shaft.

20. The apparatus, according to claim 18, in which, when the third one or the fourth one of the second controlling gear wheels are engaged to the drive shaft, the drive shaft axially rotates at the speed that third one or fourth one of the second controlling gear wheels rotates.

21. The apparatus, according to claim 18, in which the drive shaft freely rotates when the first one, the second one, the third one, and the fourth one of the second controlling gear wheels are disengaged therefrom.

22. The apparatus, according to claim 18, in which the third actuator is a third motor.

23. The apparatus, according to claim 22, in which the third motor is a servo motor.

24. The apparatus, according to claim 11, in which two or more responding gear wheels are mounted on the responding shaft, the responding gear wheels being rotatable when the responding shaft rotates.

25. The apparatus, according to claim 18, in which four responding gear wheels are mounted on the responding shaft, the responding gear wheels being rotatable when the responding shaft rotates.

26. The apparatus, according to claim 1, wherein the first and second input gear wheels are spaced apart on the input shaft and wherein the two or more first controlling gear wheels are mounted on the responding shaft for axial rotation.

27. The apparatus, according to claim 1, further comprising four responding gear wheels mounted on the responding shaft for axial rotation.

28. The apparatus, according to claim 17, wherein the first controlling gear wheels of the first controlling gear set, the second controlling gear wheels of the second controlling gear set, and the third controlling gear wheels of the third controlling gear set collectively define eight controlling gear wheels mounted on the responding shaft, the drive shaft, and the fourth shaft respectively for axial rotation.

29. The apparatus, according to claim 1, in which the gear wheels are toothed gear wheels.

30. The apparatus, according to claim 29, in which the toothed gear wheels are sized and shaped to meshingly engage each other.

31. The apparatus, according to claim 18 in which a remote controller is connected to the first, second and third actuators.

32. The apparatus, according claim 31, in which the remote controller is in wireless communication with the first, second and third actuators.

33. The apparatus, according to claim 31, in which the remote controller is a wireless signal emitting or receiving electronic device.

34. The apparatus, according to claim 1, in which a first motor is connected to the input shaft.

35. The apparatus, according to claim 1, in which the total number of available gears is eight.

36. The apparatus, according to claim 1, in which the total number of available gears is sixteen.

37. The apparatus, according to claim 1, further including a plurality of momentum generating sources.

38. The apparatus, according to claim 37, in which the momentum generating sources includes electric motors, internal combustion engines, or pneumatic engines.

39. A remote-controlled gear selection and multiplication network for a vehicle, the network comprising:
 a remote controller;
 an input shaft;
 a responding shaft; and
 a drive shaft, each in communication with each other for rotatable movement about their respective axes;
 a set of input gear wheels;
 first, second and third sets of controlling gear wheels, the set of input gear wheels, the sets of controlling gear wheels, and the shafts being interconnected such that:
  in response to a first signal received from the remote controller, one of the gear wheels of the set of the input gear wheels connects to one of the controlling gear wheels of the first set of controlling gear wheels to selectively connect to the responding shaft and one of the controlling gear wheels of the first set of controlling gear wheels connects to one of the controlling gear wheels of the second set of controlling gear wheels thereby axially rotating the drive shaft;
 wherein the total number of available gear speeds is equal to the number of the controlling gear wheels of the first controlling gear set multiplied by the number of the controlling gear wheels of the second controlling gear set.

* * * * *